United States Patent
Ogawa et al.

(10) Patent No.: US 6,258,442 B1
(45) Date of Patent: Jul. 10, 2001

(54) BIAXIALLY ORIENTED POLYESTER FILM FOR MAGNETIC RECORDING MEDIA

(75) Inventors: Tatsuya Ogawa; Hideaki Watanabe, both of Sagamihara; Manabu Kimura, Matsuyama, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/254,201

(22) PCT Filed: Jul. 6, 1998

(86) PCT No.: PCT/JP98/03030

§ 371 Date: Mar. 3, 1999

§ 102(e) Date: Mar. 3, 1999

(87) PCT Pub. No.: WO99/02584

PCT Pub. Date: Jan. 21, 1999

(30) Foreign Application Priority Data

Jul. 7, 1997 (JP) .................................................... 9-181096
Jul. 18, 1997 (JP) .................................................... 9-193811
Sep. 1, 1997 (JP) .................................................... 9-235719

(51) Int. Cl.$^7$ ........................................................ G11B 5/733
(52) U.S. Cl. ..................... 428/141; 428/216; 428/323; 428/327; 428/328; 428/329; 428/331; 428/332; 428/336; 428/337; 428/480; 428/694 SG; 428/900
(58) Field of Search ....................... 428/64.1, 65.3, 428/323, 328, 331, 332, 337, 480, 694 TR, 694 PR, 694 BR, 694 BN, 694 SG, 900, 923, 926, 141, 216, 327, 329, 336, 405

(56) References Cited

U.S. PATENT DOCUMENTS

| | | | |
|---|---|---|---|
| 4,761,327 | * 8/1988 | Hamano et al. | 428/220 |
| 5,252,388 | * 10/1993 | Murooka et al. | 428/328 |
| 5,368,932 | * 11/1994 | Murooka et al. | 428/327 |
| 5,556,691 | * 9/1996 | Etchu et al. | 428/141 |
| 5,620,774 | * 4/1997 | Etchu et al. | 428/148 |

FOREIGN PATENT DOCUMENTS

| | | |
|---|---|---|
| 0 229 670 A | 7/1987 | (EP) . |
| 0 612 790 A | 8/1994 | (EP) . |
| 63-278939A | * 11/1988 | (JP) . |
| 01190554 | * 7/1989 | (JP) . |
| 2-227439 | 9/1990 | (JP) . |
| 03056538 | * 3/1992 | (JP) . |
| 7-62115 | 3/1995 | (JP) . |
| 8-59973 | 3/1996 | (JP) . |
| 9-124952 | 5/1997 | (JP) . |

OTHER PUBLICATIONS

XP002104320 (Abstract of JP 01 223156A), DATABASE WPI, Section Ch, Week 8492, Derwent Publications, Sep. 6 1989.

* cited by examiner

Primary Examiner—Stevan A. Resan
(74) Attorney, Agent, or Firm—Sughrue, Mion, Zinn, Macpeak & Seas, PLLC

(57) ABSTRACT

A biaxially oriented polyester film for a magnetic recording medium, which comprises an aromatic polyester resin composition comprising:

(A) an aromatic polyester,
(B) silicone resin particles which can be obtained by polymerizing a silane compound containing trialkoxysilane in the presence of a surfactant and water, contain at least 80 wt % of recurring units and are substantially spherical, and
(C) other inert fine particles.

This biaxially oriented polyester film for a magnetic recording medium has an extremely small number of coarse protrusions and excellent winding property, abrasion resistance and traveling durability and can be produced at a low production cost.

26 Claims, 1 Drawing Sheet

FIG. 1

BIAXIALLY ORIENTED POLYESTER FILM FOR MAGNETIC RECORDING MEDIA

TECHNICAL FIELD

The present invention relates to a biaxially oriented polyester film for a magnetic recording medium and, more specifically, to a biaxially oriented polyester film for a magnetic recording medium which has an extremely small number of coarse protrusions and excellent winding property, abrasion resistance and traveling durability and can be produced at a low production cost.

BACKGROUND ART

A biaxially oriented polyester film typified by a polyethylene terephthalate film is used for various application purposes, particularly for magnetic recording media, due to its excellent physical and chemical properties.

The slipperiness and abrasion resistance of a biaxially oriented polyester film are important factors that affect the workability in the producing step and processing step of a film and, further, the product quality of the film. If a film lacks these properties, when a biaxially oriented polyester film is used in a magnetic tape by forming a magnetic layer on the surface, friction and abrasion between a coating roll and the film surface are large, and the film is readily wrinkled and scratched on the surface. When the film is used for a VTR or data cartridge, friction between the film and many guide portions, reproduction head and the like occurs at the time of drawing out of the cassette or the like, winding or other operation, whereby the film is scratched or distorted and white powder is formed, for example, by abrasion of the surface of the base film, thereby causing a drop out in many cases.

As a solution to these problems, JP-A 62-172031 proposes a method for adding silicone resin fine particles. This method has a great improving effect and is expected to develop as a future technology.

However, even this method encounters such a new problem as an increase in the amount of white powder generated under severe conditions including high-speed processing for improving productivity such as the formation of a magnetic layer or calendering in the recent production process of a video tape, high-speed dubbing of a soft tape, repetitions of traveling and rewinding and the like.

Further, conventional silicone resin fine particles contain a large number of coarse particles or agglomerate particles. For instance, when they are used in a base film which is required to have high electromagnetic conversion characteristics, there is such a problem that coarse protrusions called fly speck are frequently formed.

DISCLOSURE OF THE INVENTION

It is an object of the present invention to provide a biaxially oriented polyester film for a magnetic recording medium.

It is another object of the present invention to provide a biaxially oriented polyester film for a magnetic recording medium, which has an extremely small number of coarse protrusions and excellent winding property, slipperiness, abrasion resistance and traveling durability.

It is still another object of the present invention to provide a biaxially oriented polyester film for a magnetic recording medium which can be produced at a low production cost.

It is still another object of the present invention to provide a biaxially oriented polyester film for a magnetic recording medium which contain not only specific silicone resin particles but also other inert particles.

Other objects and advantages of the present invention will become apparent from the following description.

According to the present invention, firstly, the above objects and advantages of the present invention are attained by a biaxially oriented polyester film (may be referred to as "the first polyester film of the present invention" hereinafter) for a magnetic recording medium, which comprises an aromatic polyester resin composition comprising:

(A) an aromatic polyester;
(B) 0.01 to 0.3 wt % of silicone resin particles
   (a) which can be obtained by polymerizing a silane compound containing trialkoxysilane represented by the following formula (1):

$$R^1Si(OR^2)_3 \qquad (1)$$

wherein $R^1$ is an alkyl group having 1 to 6 carbon atoms or a phenyl group and $R^2$ is an alkyl group having 1 to 4 carbon atoms,
in the presence of a surfactant and water and contain at least 80 wt % of recurring units represented by the following formula (2):

$$R^1SiO_{3/2} \qquad (2)$$

wherein $R^1$ is the same as defined above,
   (b) which are substantially spherical, and
   (c) which have an average particle diameter of 0.1 to 1.0 μm; and
(C) 0.05 to 1.0 wt % of other inert fine particles having an average particle diameter, smaller than that of the above silicone resin particles, of 0.01 to 0.5 μm.

According to the present invention, secondly, the above objects and advantages of the present invention are attained by a biaxially oriented polyester film (may be referred to as "the second polyester film of the present invention" hereinafter) for a magnetic recording medium, which comprises an aromatic polyester resin composition comprising:

(A) an aromatic polyester;
(B) 0.001 to 0.03 wt % of silicone resin particles
   (a) which can be obtained by polymerizing a silane compound containing trialkoxysilane represented by the following formula (1):

$$R^1Si(OR^2)_3 \qquad (1)$$

wherein $R^1$ is an alkyl group having 1 to 6 carbon atoms or a phenyl group and $R^2$ is an alkyl group having 1 to 4 carbon atoms,
in the presence of a surfactant and water and contain at least 80 wt % of recurring units represented by the following formula (2):

$$R^1SiO_{3/2} \qquad (2)$$

wherein $R^1$ is the same as defined above,
   (b) which are substantially spherical, and
   (c) which have an average particle diameter of 0.8 to 1.6 μm;
(C) 0.1 to 0.6 wt % of inert fine particles B having an average particle diameter of 0.4 to 0.7 μm; and
(D) 0.05 to 1.0 wt % of inert fine particles C having an average particle diameter of 0.01 to 0.3 μm and a Mohs hardness of 7 or more.

A description is first given of the first polyester film of the present invention and then of the second polyester film of the present invention.

The aromatic polyester in the present invention is a polyester comprising an aromatic dicarboxylic acid as a main acid component and an aliphatic glycol as a main glycol component. The polyester is substantially linear and has film formation properties, particularly film formation properties by melt molding. Illustrative examples of the aromatic dicarboxylic acid include terephthalic acid, 2,6-naphthalenedicarboxylic acid, isophthalic acid, diphenoxyethanedicarboxylic acid, biphenyldicarboxylic acid, diphenyl ether dicarboxylic acid, diphenyl sulfone dicarboxylic acid, diphenyl ketone dicarboxylic acid, anthracenedicarboxylic acid and the like. Illustrative examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol; alicyclic diols such as 1,4-cyclohexane dimethanol; and the like.

In the present invention, preferred are polyesters comprising alkylene terephthalate and/or alkylene naphthalene dicarboxylate as the main recurring component(s).

Of the above polyesters, particularly preferred are homopolymers such as polyethylene terephthalate and polyethylene-2,6-naphthalene dicarboxylate, and copolymers comprising terephthalic acid and/or 2,6-naphthalenedicarboxylic acid in an amount of 80 mol % or more of the total of all dicarboxylic acid components and ethylene glycol in an amount of 80 mol % or more of the total of all glycol components. Twenty mole percent or less of the total of all acid components may be the above aromatic dicarboxylic acid other than terephthalic acid and/or 2,6-naphthalenedicarboxylic acid, an aliphatic dicarboxylic acid such as adipic acid or sebacic acid, or an alicyclic dicarboxylic acid such as cyclohexane-1,4-dicarboxylic acid. Twenty mole percent or less of the total of all glycol components may be the above glycol other than ethylene glycol, an aromatic diol such as hydroquinone, resorcin or 2,2-bis(4-hydroxyphenyl)propane, an aliphatic diol having an aromatic ring such as 1,4-dihydroxydimethylbenzene, or a polyalkylene glycol(polyoxyalkylene glycol) such as polyethylene glycol, polypropylene glycol or polytetramethylene glycol.

The polyester in the present invention also includes copolymerized with or bonded to 20 mol % or less, based on the total weight of a dicarboxylic acid component and a hydroxy carboxylic acid component, of a component derived from a hydroxy carboxylic acid such as an aromatic hydroxy acid exemplified by hydroxybenzoic acid or an aliphatic hydroxy acid exemplified by ω-hydroxycaproic acid.

The silicone resin particles in the present invention contain at least 80 wt % of recurring units represented by the following formula (2):

$$R^1SiO_{3/2} \qquad (2)$$

wherein $R^1$ is selected from an alkyl group having 1 to 4 carbon atoms and a phenyl group.

The silicone resin comprising the above recurring units has a bonding unit represented by the following formula when attention is paid to a single silicon atom (Si).

Since each of three oxygen atoms (O) in this formula is also bonded to a respective adjacent silicon atom (not shown in the formula), they are shared by two silicon atoms each. Therefore, the recurring unit is represented by $R^1SiO_{3/2}$, as shown above.

$R^1$ in the above formula is selected from either an alkyl group having 1 to 4 carbon atoms or a phenyl group. Specific examples of the alkyl group include a methyl group, ethyl group, n-propyl group, n-butyl group and the like. They may be used in combination. Silicone resin particles having a methyl group as R (i.e., polymethylsylsesquioxane) are preferred.

The above silicone resin particles used in the present invention can be produced by polymerizing a silane compound containing trialkoxysilane represented by the following formula (1):

$$R^1Si(OR^2)_3 \qquad (1)$$

wherein $R^1$ is the same as defined above and $R^2$ is an alkyl group having 1 to 4 carbon atoms, in the presence of a catalytic surfactant and water. When the silicone resin particles produced by this method are used, a film of high quality having a small number of coarse protrusions can be obtained.

In the above formula (1), $R^1$ is the same as defined above. $R^2$ is an alkyl group having 1 to 4 carbon atoms, such as methyl, ethyl, n-propyl, iso-butyl, n-butyl or the like.

Specific examples of the compound include methyl trimethoxysilane, phenyl trimethoxysilane, ethyl trimethoxysilane, ethyl triethoxysilane, propyl trimethoxysilane, butyl trimethoxysilane and the like.

These compounds may be used alone or in combination of two or more. For example, when methyl trimethoxysilane and ethyl trimethoxysilane are used together, copolymerized silicone resin particles comprising a compound having a methyl group as the $R^1$ in the recurring unit represented by the above formula and a compound having an ethyl group as the $R^1$ can be obtained.

Illustrative examples of the surfactant include polyoxyethylene alkyl ethers, polyoxyethylene alkylphenyl ethers, polyoxyethylene sorbitan alkyl esters, alkylbenzene sulfonates and the like. Of these, polyoxyethylene alkylphenyl ethers and alkylbenzene sulfonates are preferred. Of the polyoxyethylene alkylphenyl ethers, an adduct of nonylphenyl with ethylene oxide is preferred, and of the alkylbenzene sulfonates, sodium dodecylbenzene sulfonate is preferred.

When silicone resin particles are polymerized without using the above surfactant, the number of substantially non-spherical, amorphous coarse particles increases, thereby causing coarse protrusions when a film is formed therefrom.

The silicone resin particles used in the present invention are substantially spherical and preferably have a volume shape coefficient of 0.4 to 0.52. The silicone resin particles have an average particle diameter of 0.1 to 1.0 μm. When the particles having the average particle diameter of smaller than 0.1 μm are contained in the film, they hardly provide slipperiness and abrasion resistance to a film. On the other hand, when the particles having the average particle diameter of larger than 1.0 μm are contained in the film, they readily impair the surface flatness of a film. The average particle diameter is preferably in the range of 0.2 to 0.6 μm.

The content of the silicone resin particles is 0.01 to 0.3 wt %, preferably 0.01 to 0.2 wt %, more preferably 0.01 to 0.1 wt %. When the content is smaller than 0.01 wt %, the slipperiness of the resulting film deteriorates. On the other hand, when the content is larger than 0.3 wt %, the film surface becomes rough and electromagnetic conversion characteristics and abrasion resistance deteriorate.

The silicone resin particles have a particle size distribution with a relative standard deviation value of 0.3 or less.

The silicone resin particles preferably contain particles having a particle diameter 3 times or more the average particle diameter only at a density of 30 or less per million particles.

The silicone resin particles used in the present invention preferably have a hydroxyl value at the surface of 3 to 40 KOHmg/g.

The silicone resin particles may be surface-treated with a silane coupling agent before use. The abrasion resistance of the obtained film can be greatly improved by this surface treatment.

Illustrative examples of the silane coupling agent include silanes having an unsaturated bond such as vinyl triethoxysilane, vinyl trichlorosilane and vinyl tris(β-methoxyethoxy)silane; amino-based silanes such as N-β (aminoethyl) γ-aminopropylmethyl dimethoxysilane, N-β (aminoethyl) γ-aminopropyl trimethoxysilane, γ-aminopropyl trimethoxysilane, γ-aminopropyl triethoxysilane and N-phenyl-γ-aminopropyl trimethoxysilane; epoxy-based silanes such as β(3,4-epoxycyclohexyl)ethyl trimethoxysilane, γ-glycidoxypropyl trimethoxysilane, γ-glycidoxypropylmethyl diethoxysilane and γ-glycidoxypropyl triethoxysilane; methacrylate-based silanes such as γ-methacryloxypropylmethyl dimethoxysilane, γ-methacryloxypropyl trimethoxysilane, γ-methacryloxypropylmethyl diethoxysilane and γ-methacryloxypropyl triethoxysilane; γ-mercaptopropyl trimethoxysilane; γ-chloropropyl trimethoxysilane; and the like. Of these, epoxy-based silane coupling agents are preferred because they are easy to handle, make the coloration of a film difficult when added to a polyester and have a great effect to improve abrasion resistance.

The surface treatment with a silane coupling agent comprises filtering or centrifuging a slurry (aqueous slurry or organic solvent slurry) of silicone resin particles right after synthesis to separate silicone resin particles, dispersing the silicone resin particles into silane coupling agent-containing water or organic solvent before drying to prepare a slurry thereof again, heating the slurry to separate the particles again and drying the separated particles. According to the type of the silane coupling agent used, a further heat treatment is preferably carried out from a practical point of view. A slurry of the dried silicone resin fine particles may be prepared again in the same manner as described above, and the method for surface treatment is not particularly limited.

The silicone resin particles surface-treated with a silane coupling agent preferably have a hydroxyl value at the surface of 3 to 10 KOHmg/g.

The silicone resin particles surface-treated with a silane coupling agent in the present invention are particularly excellent, prevent the generation of white powder and improve abrasion resistance. The mechanism therefor is assumed to be such that, for one thing, a starting material component contained in the silicone resin particles, an unreacted product such as the hydrolyzate of organotrialkoxysilane which is one of the raw materials, or a terminal silanol group in the silicone resin is chemically bonded to the silane coupling agent to be stabilized, thereby preventing the segregation or escape of these materials, which are produced in an untreated state, onto the surface of a film and that, for another thing, the affinity of silicone resin fine particles which are considered to have low affinity for a polyester is improved by the adsorption of the silane coupling agent to the particles, thereby suppressing the fall-off of the fine particles by abrasion and the generation of white powder such as abrasion dusts of the polyester around the fine particles.

The first polyester film of the present invention further contains other inert fine particles.

The average particle diameter of the other inert fine particles is 0.01 to 0.5 μm and must be smaller than the average particle diameter of the above silicone resin fine particles. When the average particle diameter of the inert fine particles is smaller than 0.01 μm, slipperiness and scratch resistance deteriorate. On the other hand, when the average particle diameter is larger than 0.5 μm, abrasion resistance and scratch resistance deteriorate, the surface of the obtained film becomes rough and electromagnetic conversion characteristics degenerate.

If the average particle diameter of the other inert fine particles is larger than the average particle diameter of the silicone resin fine particles, the effect of containing the silicone resin fine particles lowers and slipperiness, abrasion resistance and the like deteriorate.

The average particle diameter of the other inert fine particles is preferably 0.01 to 0.3 μm, more preferably 0.01 to 0.15 μm.

The content of the other inert fine particles must be 0.05 to 1.0 wt %. When the content is smaller than 0.05 wt %, slipperiness and scratch resistance deteriorate. On the other hand, when the content is larger than 1.0 wt %, abrasion resistance deteriorates. The content of the other inert fine particles is preferably 0.1 to 0.6 wt %, more preferably 0.2 to 0.4 wt %.

Specific examples of the other inert fine particles include (1) silicone dioxide (including hydrate, quartz sand, quartz and the like); (2) alumina in various crystal forms; (3) silicates containing 30 wt % or more of a $SiO_2$ component {such as amorphous or crystalline clay minerals, alumino silicate (including baked and hydrated products, chrysotile, zircon, fly ash and the like}; (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (such as carbon black and graphite); (12) glass (such as glass powder and glass beads); (13) carbonates of Ca and Mg; (14) fluorite; and (15) spinel-type oxides. Of these, aluminum oxide, silica particles and spinel-type oxide particles are particularly preferred because they provide excellent abrasion resistance and scratch resistance.

The first polyester film of the present invention is preferred because it can achieve particularly excellent electromagnetic conversion characteristics when the center line average roughness Ra of the film surface is 10 nm or less. Ra is particularly preferably in the range of 3 to 10 nm.

Although the first polyester film of the present invention also has excellent characteristic properties as a single-layer film as described above, when it forms a laminate structure with another film layer, there can be provided a biaxially oriented laminate polyester film with excellent flatness that can be produced at a low production cost.

That is, according to the present invention, there is also provided a biaxially oriented polyester film for a magnetic recording medium, which has the first polyester film of the present invention and another aromatic polyester film formed on at least one side of the film, the first polyester film of the present invention having a thickness of 0.1 to 1.0 μm.

When the polyester film of the present invention has such a laminate structure, the first polyester film of the present invention as layer A is formed on at least one side of another polyester film B. The laminate structure is preferably a double-layer structure consisting of layer A/layer B or a three-layer structure consisting of layer A/layer B/layer A. Of these, the three-layer structure is preferred from the viewpoint of production cost because a waste film produced in the production process of a polyester film can be recovered and re-used in the polyester film layer B.

Illustrative examples of the polyester film forming the polyester film layer B are the same as those listed and described for the polyester forming the polyester film layer A. The polyesters are preferably identical.

In this laminate film, the polyester film layer B may or may not contain inert fine particles. When it contains inert fine particles, the content of the inert fine particles is preferably smaller than 50% based on the content of the polyester film layer A. When the content is 50% or more based on the content of the polyester film layer A, the inert fine particles affect the characteristic properties of the polyester film layer A disadvantageously.

The thickness of the polyester film layer A in the laminate film is 0.1 to 2.0 μm. When the thickness is larger than 2.0 μm, the resulting laminate film has the same characteristic properties as those of a single-layer film. On the other hand, when the thickness is smaller than 0.1 μm, the particles readily fall off, abrasion resistance deteriorates and the film surface becomes too flat, whereby slipperiness deteriorates.

The first polyester film of the present invention has excellent abrasion resistance and preferably shows only such blade abrasion resistance that the width of abrasion dust adhered to the edge of a blade is smaller than 0.5 mm.

The first polyester film of the present invention preferably has protrusions with secondary or higher-order interference fringes on the surface at a density of 1.5 or less per cm$^2$. The polyester film is preferred because the number of drop outs is extremely small when this polyester film is used as a magnetic recording medium.

A description is subsequently given of the second polyester film of the present invention.

The second polyester film of the present invention comprises an aromatic polyester composition comprising (A) an aromatic polyester, (B) silicone resin particles, (C) inert fine particles having an average particle diameter of 0.4 to 0.7 μm (to be referred to as "inert fine particles B" hereinafter) and (D) inert fine particles having an average particle diameter of 0.01 to 0.3 μm and a Mohs hardness of 7 or more (to be referred to as "inert fine particles C" hereinafter).

Illustrative examples of the aromatic polyester (A) are the same as those listed for the first polyester film. As for what is not described herein of the aromatic polyester, it should be understood that what has been described of the first polyester film is directly applied.

The silicone resin particles (B) have the same composition as that of the silicone resin particles used in the first polyester film and can be advantageously produced in the same manner as the silicone resin particles used in the first polyester film.

However, the silicone resin particles used herein have an average particle diameter of 0.8 to 1.6 μm. When the average particle diameter is smaller than 0.8 μm, the effect of improving the slipperiness and winding property of the film is small. On the other hand, when the average particle diameter is larger than 1.6 μm, the surface flatness of the film is difficult to obtain disadvantageously. The average particle diameter is preferably 0.9 to 1.2 μm.

The content of the silicone resin particles is 0.001 to 0.03 wt %, which is very small.

It is preferably 0.001 to 0.02 wt %, more preferably 0.001 to 0.01 wt %. When this content is too small, the slipperiness and winding property of the resulting film deteriorate. On the other hand, when the content is too large, the film surface becomes rough, thereby deteriorating the electromagnetic conversion characteristics and abrasion resistance of the film, disadvantageously.

As for what is not described herein of the silicone resin particles and their production process, it should be understood that what has been described of the first polyester film is directly applied.

The second polyester film further contains inert fine particles B and C.

The inert fine particles B have an average particle diameter $d_B$ of 0.4 to 0.7 μm and are contained in an amount of 0.1 to 0.6 wt %. When the average particle diameter $d_B$ of the inert fine particles B and the content thereof are smaller than the above ranges, the slipperiness of the resulting film deteriorates, thereby making winding of the film difficult and making traveling of a tape obtained therefrom instable. On the other hand, when the average particle diameter $d_B$ and the content are larger than the above ranges, the abrasion resistance of the resulting film deteriorates. The average particle diameter $d_B$ of the inert fine particles B is preferably in the range of 0.4 to 0.65 μm, more preferably 0.4 to 0.6 μm. The content of the inert fine particles B is preferably in the range of 0.15 to 0.5 wt %, more preferably 0.2 to 0.4 wt %.

The inert fine particles B are not limited to a particular type but preferably selected from (1) silicone dioxide (including hydrate, quartz sand, quartz and the like); (2) alumina in various crystal forms; (3) silicates containing 30 wt % or more of a $SiO_2$ component {such as amorphous or crystalline clay minerals, alumino silicate (including baked and hydrated products), chrysotile, zircon, fly ash and the like}; (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe. Co and Ni; (10) chromates of Ba and Pb; (11) carbon (such as carbon black and graphite): (12) glass (such as glass powder and glass beads); (13) carbonates of Ca and Mg; (14) fluorite; and (15) Zn. Of these, calcium carbonate is the most preferred.

The inert fine particles C are inert inorganic fine particles having a Mohs hardness of 7 or more, have an average particle diameter $d_C$ of 0.01 to 0.3 μm and are contained in an amount of 0.05 to 1.0 wt %. When the Mohs hardness of the inert inorganic fine particles C is less than 7, the scratch resistance of the resulting film becomes insufficient disadvantageously. The inert inorganic fine particles having a Mohs hardness of 7 or more are preferably made from aluminum oxide (alumina) or spinel-type oxide.

When the inert inorganic fine particles C are made from aluminum oxide (alumina) and have a θ-type crystal structure, the effect of improving the scratch resistance of the resulting film is advantageously large. When the inert inorganic fine particles C are made form a spinel-type oxide, for example, $MgAl_2O_4$, the effect of improving the scratch resistance of the resulting film is advantageously large.

When the average particle diameter $d_c$ of the inert inorganic fine particles C and the content thereof are smaller than the above ranges, the effect of improving the scratch resistance of the resulting film is insufficient disadvantageously. On the other hand, when the average particle diameter $d_c$ and the content are larger than the above ranges, the effect of improving the scratch resistance of the resulting film is insufficient and the abrasion resistance of the film deteriorates disadvantageously. The average particle diameter $d_c$ of the inert inorganic fine particles C is preferably in the range of 0.03 to 0.25 μm, more preferably 0.05 to 0.2 μm. The content of the inert inorganic fine particles C is preferably in the range of 0.1 to 0.7 wt %, more preferably 0.15 to 0.4 wt %, the most preferably 0.2 or more and less than 0.25 wt %.

The center line average roughness Ra of the second polyester film of the present invention is preferably 10 to 25 nm, more preferably 12 to 24 nm, particularly preferably 14 to 23 nm. When the center line average roughness Ra is less than 10 nm, the surface becomes so flat that the effect of improving winding property and traveling durability is small. On the other hand, when the center line average roughness Ra is more than 25 nm, the surface becomes so rough that the electromagnetic conversion characteristics of the obtained magnetic tape deteriorate.

Thus, the second polyester film of the present invention also has excellent characteristic properties as a single-layer film as described above. However, when it forms a laminate structure with another film layer, there can be obtained a biaxially oriented laminate polyester film with excellent flatness that can be produced at a low production cost.

That is, according to the present invention, there is provided a biaxially oriented polyester film for a magnetic recording medium, which has the second polyester film of the present invention and another aromatic polyester film formed on at least one side of the film, the second polyester film of the present invention having a thickness of 0.5 to 2.0 μm.

When the polyester film of the present invention has such a laminate structure, the second polyester film of the present invention as layer A is formed on at least one side of another polyester film B. The laminate structure is preferably a double-layer structure consisting of layer A/layer B or a three-layer structure consisting of layer A/layer B/layer A. Of these, the three-layer structure is preferred from the viewpoint of production cost because a waste film produced in the production process of a polyester film can be recovered and re-used in the polyester film layer B.

Illustrative examples of the polyester forming the polyester film layer B are the same as those listed and described for the polyester forming the polyester film layer A. The polyesters are preferably identical.

In the laminate film of the present invention, the polyester film layer B may not contain inert particles. However, when inert particles having an average particle diameter of 0.4 μm or more, such as the above silicone resin fine particles A, the inert fine particles B or the like, are contained in the layer B in an amount $(W_B)$ that satisfies the following expression, a waste film produced in the production process of the polyester film can be recovered and re-used in the layer B advantageously.

$$W_B = W_A \times L_A/L_B \times R/(1-R)$$

wherein $W_A$ is the total content (wt %) of the silicone resin fine particles A and the inert fine particles B both of which are contained in the polyester film layer A, $W_B$ is the content (wt %) of inert particles with an average particle diameter of 0.4 μm or more that are contained in the polyester film layer B, $L_A$ is the total thickness (μm) of the polyester film layer A, $L_B$ is the thickness (μm) of the polyester film layer B, and R is a numeral value of 0.3 to 0.7.

In the above expression, when R (value) is larger than 0.7 or smaller than 0.3, the content of the inert particles with an average particle diameter of 0.4 μm or more that are contained in the polyester film layer B formed of a recovered film varies greatly, whereby the surface roughness of the polyester film layer A also varies greatly disadvantageously. R is preferably 0.4 to 0.6. Even when small inert particles with an average particle diameter of less than 0.4 μm are contained in the polyester layer B, the influence of the particles on the surface of the polyester film layer A is small.

In the above laminate film, the surface properties of the layer A can be controlled to specific ranges by limiting the thickness of the polyester film layer A to a specific range. However, the thickness of the polyester film layer A must be in the range of 0.5 to 2.0 μm. When the thickness is larger than 2.0 μm, the resulting laminate film has the same characteristic properties as those of a single-layer film. On the other hand, when the thickness is smaller than 0.50 μm, the particles readily fall off, the abrasion resistance of the resulting film deteriorates, and the surface of the film becomes too flat, whereby traveling durability and winding property deteriorate.

The second polyester film of the present invention has excellent abrasion resistance as does the first polyester film and shows such blade abrasion resistance that the width of abrasion dust adhered to the edge of a blade is smaller than 0.5 mm.

The second polyester film of the present invention preferably has protrusions with tertiary or higher-order interference fringes on the surface at a density of 1.0 or less per $cm^2$.

When the polyester film is used in a magnetic recording medium, the number of drop outs becomes extremely small advantageously.

The second biaxially oriented polyester film of the present invention, regardless of whether it is a single-layer film or a laminate film, preferably has a winding property index of 100 or less at a winding rate of 200 m/min. When the winding property index is 100 or less, the effect of improving winding property is marked advantageously. On the other hand, when the winding property index is larger than 100, the shape of a roll of the film wound at a high speed becomes bad as a result of non-uniform end or the like. In an extreme case, the roll collapses during winding disadvantageously. The winding property index at a winding rate of 200 m/min is more preferably 85 or less, particularly preferably 70 or less.

The biaxially oriented polyester film of the present invention can be basically obtained in accordance with conventionally known methods and methods which have been accumulated in the industry. For instance, it can be obtained by first producing an unstretched film and biaxially orienting it. The unstretched film having an intrinsic viscosity of 0.35 to 0.9 dl/g can be obtained by melt extruding a polyester into a film at a temperature of a melting point (Tm: °C.) to (Tm+70)°C. and solidifying the film by quenching.

This unstretched film can be formed into a biaxially oriented film in accordance with conventional biaxially oriented film production methods which have been accumulated. For instance, it can be produced by stretching an unstretched film to 2.5 to 7.0 times in a uniaxial direction (longitudinal or transverse direction) at a temperature of (Tg−10) to (Tg+70)°C. (Tg: glass transition temperature of a polyester) and then to 2.5 to 7.0 times in a direction perpendicular to the above direction (transverse direction when previously stretched in a longitudinal direction) at a temperature of Tg(°C.) to (Tg+70)°C. In this case, the area stretch ratio is preferably 9 to 32 times, more preferably 12 to 32 times. Stretching may be either simultaneous biaxial stretching or sequential biaxial stretching. The biaxially oriented film may be heat-set at a temperature of (Tg+70)°C. to Tm°C. For example, a polyethylene terephthalate film is preferably heat-set at a temperature of 190 to 230° C. The heat setting time is 1 to 60 sec., for example.

A laminate film can be obtained by first producing an unstretched laminate film and then biaxially orienting it in the same manner as described above.

This unstretched laminate film can be produced in accordance with conventional laminate film production methods which have been accumulated heretofore. For instance, it can be produced by laminating together a film layer forming a surface (polyester layer A) and a film layer forming a core layer (polyester layer B) while they are molten or solidified by quenching. Stated more specifically, it can be produced by coextrusion, extrusion lamination or the like.

The biaxially oriented polyester film of the present invention preferably has a thickness of 3 to 20 μm.

The biaxially oriented polyester film of the present invention contains a combination of specific silicone resin fine particles and other specific inert particles and has an extremely small number of coarse protrusions and excellent winding property, abrasion resistance and traveling durability. Therefore, it is useful as a base film for a magnetic recording medium.

Various physical properties and characteristic properties in the present invention were measured and defined as follows.

(1) Average particle diameter (d) of particles
(i) when average particle diameter is obtained from granule (centrifugal sedimentation method)

This is measured using the CP-50 model centrifugal particle size analyzer of Shimadzu Corporation. A particle diameter corresponding to 50 mass percent is read from a cumulative curve of the particle diameter calculated based on the obtained centrifugal sedimentation curve and the amount of particles having the particle diameter, and it is taken as the average particle diameter (refer to "Book of Particle Size Measurement Technology" issued by Nikkan Kogyo Press, pp. 242–247, 1975).

(ii) when particles are contained in film

A sample film piece was fixed to a sample table of a scanning electron microscope and the surface of the film was ion-etched under the following conditions using the sputtering device (JFC-1100 model ion-etching device) of JEOL Ltd.. The sample was placed in a bell-jar, the pressure was reduced to about $10^{-3}$ Torr, and ion etching was carried out at a voltage of 0.25 kV and a current of 12.5 mA for about 10 minutes. Further, the surface of the film was subjected to gold-sputtering with the same device and observed through a scanning electron microscope at a magnification of 50,000 to 10,000×, the equivalent sphere diameter distribution of at least 100 particles was obtained by the Luzex 500 of Nippon Regulator Co., Ltd., and the average particle diameter of the particles was calculated from a weight-integrated 50% point.

(2) Volume shape coefficient (f)

Photos of silicone resin fine particles in 10 different view fields are taken by a scanning electron microscope at a magnification of 5,000×, the average value of maximum diameters is calculated for each view field by the Luzex 500 image analyzer (of Nippon Regulator Co., Ltd.), and the average value of the maximum diameters of 10 different view fields is further obtained as D.

The volume of each particle is calculated from the expression $v = \pi d^3/6$ using the average particle diameter (d) obtained in the above paragraph (1), and the shape coefficient f is calculated from the following expression.

$$f = V/D^3$$

wherein V is the volume ($\mu m^3$) of the particle and D is the maximum diameter ($\mu m$) of the particle.

(3) Relative standard deviation of particle diameter

A differential particle size distribution is obtained from the integral curve in the above paragraph (1) and the relative standard deviation is computed from the following expression for defining the relative standard deviation.

$$\text{relative standard deviation} = \sqrt{\sum_{i=1}^{n}(Di-DA)^2 \cdot \phi i / DA}$$

wherein Di is the particle diameter of each particle obtained in the above paragraph (1), DA is the average particle diameter obtained in the above paragraph (1), n is the number of divisions when the integral curve of the above paragraph (1) is obtained, and $\phi i$ is the mass percent of particles of each particle size.

(4) Number of coarse particles contained in polymer
(i) polymer depolymerization method An appropriate amount of a polymer containing particles is sampled and depolymerized by adding an excess of ethylene glycol (triethylene glycol or tetraethylene glycol when a polymer component remains). Thereafter, the particles are extracted by centrifugation or filtration and fully washed with ethanol. The extracted particles are diluted with and dispersed in ethanol and filtered with a straight-hole membrane filter having meshes each of which is 3 times larger than the average particle diameter. After the end of filtration, the surface of the filter was further washed with ethanol to carry out filtration. After filtration, the filter is dried, subjected to gold sputtering and observed through a scanning electron microscope at a magnification of 500 to 1,000× to count the number of coarse particles on the filter. The number of particles is calculated from the weight of particles used for filtration and the average particle diameter and density of the particles to obtain the total number of the particles from which the number of coarse particles per million particles is calculated.

(ii) polymer dissolution method

An appropriate amount of a polymer containing spherical particles is sampled, an excess of an E-sol solution (weight ratio (wt %) of 1,1,2,2-tetrachloroethane to phenol=40/60) is added to this, and the resulting mixture is heated at 120 to 140° C. under agitation and maintained at the above temperature for about 3 to 5 hours to dissolve the polyester. When a crystallized portion of the polyester does not dissolve, the heated E-sol solution is quenched once and the above dissolution operation is carried out again. After the particles are extracted by centrifugation or filtration and a polymer component remaining in the particles is removed by the E-sol solution, the extracted particles are diluted with and dispersed in an organic solvent and filtered with a straight-hole membrane filter having meshes each of which is 3 times larger than the average particle diameter of the particles. After the end of filtration, the surface of the filter is further washed with the organic solvent to carry out filtration. After filtration, the filter is dried, subjected to gold sputtering and observed through a scanning electron microscope at a magnification of 500 to 1,000× to count the number of coarse particles on the filter. The number of coarse particles is obtained in the same manner as described in the above paragraph (i).

(5) Hydroxyl value at surface of silicone resin particle

This is measured in accordance with the following procedure.

(A) One to three grams of silicone resin particle powder (to be referred to as "silicone powder" hereinafter) which has been dried to remove as much water adhered thereto as possible is weighed accurately.

(B) An acetylating agent (prepared by dissolving 4-dimethylaminopyridine in xylene) and a predetermined amount of acetic anhydride were added excessively to the weighed silicone powder to conduct acetylation.

(C) A predetermined amount of di-n-butylamine is added excessively to the solution obtained after acetylation in (B) to acetylate an excess of the acetic anhydride added in (B).

(D) Using a Bromophenol Blue solution as an indicator, an excess of the di-n-butylamine in (C) is titrated with a hydrochloride acid solution whose strength has been measured. The strength is measured by titration with a Methyl Orange solution using potassium hydroxide as a standard solution.

(E) Blank experiments are conducted in accordance with the procedures (A) to (D).

Through comparison with the blank experiments, the amount of acetic anhydride consumed by hydroxyl groups is obtained and the amount of the hydroxyl groups, KOHmg/g, is calculated from the following expression.

$$\text{hydroxyl value} = ((A-B) \times F)/S$$

wherein A is the consumption (ml) of the hydrochloric acid solution used in the real experiments, B is the consumption (ml) of the hydrochloric acid solution used in the blank experiments, F is the strength of the hydrochloric acid solution (KOHmg/ml) and S is the amount (g) of sampled silicone powder.

(6) Film surface roughness (Ra)

The center line average roughness (Ra) is defined by JIS B0601 and measured using the tracer-type surface roughness meter (SURFCORDER SE-30C) of Kosaka Laboratory Co., Ltd. in the present invention. The measurement conditions are as follows.

(a) radius of tracer tip: 2 μm (b) measurement pressure: 30 mg (c) cut-off: 0.25 mm (d) measurement length: 2.5 mm (e) data filing: The measurement of the surface roughness of the same sample is repeated 6 times and the average of five measurement values excluding the largest value is taken as Ra.

(7) Abrasion resistance against calender

The abrasion resistance of the traveling surface of a base film is evaluated using a three-stage mini-super calender. The calender is a three-stage calender having nylon roll(s) and steel roll(s), the treatment temperature 80° C., the line pressure applied to the film 200 kg/cm, and the film speed 100 m/min. The abrasion resistance of the base film is evaluated by stains adhered to the top roll of the calender after the film is caused to travel a total length of 4,000 m. (This is expressed as calender abrasion resistance in Table 2).

<5-grade criterion> grade 1: no stains on nylon roll grade 2: almost no stains on nylon roll grade 3: slight stains on nylon roll but easily wiped off with dry cloth grade 4: Stains on nylon roll are hardly wiped off with dry cloth but can be wiped off with a solvent such as acetone.

grade 5: Nylon roll is heavily stained and hardly cleaned with a solvent.

(8) Abrasion resistance against blade

The edge of a blade (blade for an industrial razor tester of GKI in US) is applied vertically onto a film cut to a width of ½ inch at a temperature of 20° C. and a humidity of 60% and pushed to the film at a depth of 2 mm to be contacted with the film. The film is caused to travel (or subjected to friction) at a rate of 100 m/min and an inlet tension $T_1$ of 50 g. After the film travels 100 m, the amount of abrasion dusts adhered to the blade is evaluated.

<criterion>

⊚: The width of the abrasion dust adhered to the edge of the blade is smaller than 0.5 mm.

○: The width of the abrasion dust adhered to the edge of the blade is 0.5 mm or more and smaller than 1.0 mm.

Δ: The width of the abrasion dust adhered to the edge of the blade is 1.0 mm or more and smaller than 2.0 mm.

X: The width of the abrasion dust adhered to the edge of the blade is 2.0 mm or more.

(9) High-speed traveling scratch resistance, abrasion resistance

These are measured using the apparatus shown in FIG. 1 as follows.

Figure 1:
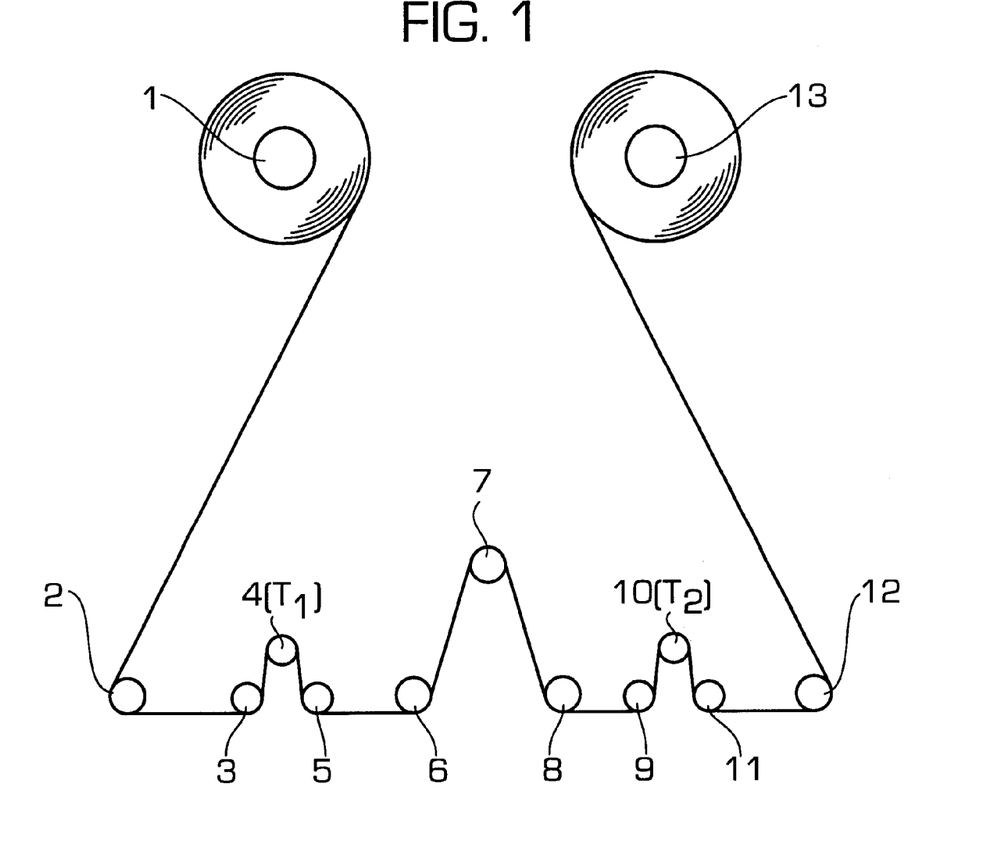

In FIG. 1, reference numeral 1 denotes a feed reel, 2 a tension controller, 3, 5, 6, 8, 9 and 11 free rollers, 4 a tension detector (inlet), 7 a fixed rod, 10 a tension detector (outlet), 12 a guide roller and 13 a take-up reel.

At a temperature of 20° C. and a humidity of 60%, a film cut to a width of ½ inch is brought into contact with the fixed rod 7 at an angle θ of 60° and caused to travel 200 m at a rate of 300 m/min so that the tension at inlet becomes 50 g. After traveling, abrasion dusts adhered to the fixed rod 7 and the scratch of the film are evaluated.

Method A uses a sufficiently surface-finished 6-φ tape guide (surface roughness Ra=0.015 μm) made from SUS 304 as the fixed rod.

Method B uses a 6-φ tape guide, prepared by bending a SUS sintered plate into a cylindrical form and not sufficiently surface-finished (surface roughness Ra=0.15 μm), as the fixed rod.

Method C uses a 6-φ tape guide made from carbon black-containing polyacetal as the fixed rod.

<criterion of abrasion resistance>

⊚: No abrasion dusts was observed.

○: A slight amount of abrasion dust was observed.

Δ: The existence of abrasion dust was noticed at first sight.

X: Abrasion dust was heavily adhered.

<criterion of scratch resistance>

⊚: No scratch was seen.

○: One to five scratches were seen.

Δ: Six to 15 scratches were seen.

X: Sixteen or more scratches were seen.

(10) Low-speed repeated traveling friction coefficient ($\mu k$), scratch resistance These are measured using the apparatus shown in FIG. 1 as follows.

At a temperature of 20° C. and a humidity of 60%, the non-magnetic surface of a magnetic tape is brought into contact with the fixed rod 7 at an angle θ of (152/180) π radian (152°) and moved (or subjected to friction) thereon at a rate of 200 cm/min. The outlet tension ($T_2$:g) when the tension controller 2 is adjusted to ensure that inlet tension $T_1$ becomes 50 g is detected by the outlet tension detector after the film has made 50 round trips and the traveling friction coefficient $\mu k$ is calculated from the following expression.

$$\mu k = (2.303/\theta)\log(T_2/T_1) = 0.868\log(T_2/50)$$

When the film is caused to travel repeatedly in a VTR with the traveling friction coefficient ($\mu k$) of 0.25 or more, traveling becomes instable. Therefore, a film having a traveling friction coefficient of 0.25 or more is evaluated as deficient in traveling durability.

Method A uses a sufficiently surface-finished 6-φ tape guide (surface roughness Ra=0.015 μm) made from SUS 304 as the fixed rod.

Method B uses a 6-φ tape guide, prepared by bending a SUS sintered plate into a cylindrical form and not sufficiently surface-finished (surface roughness Ra=0.15 μm), as the fixed rod.

Method C uses a 6-φ tape guide made from carbon black-containing polyacetal as the fixed rod.

The scratch resistance of the non-magnetic surface of a tape after traveling is evaluated based on the following criterion.

<criterion>

⊚: No scratch was seen.

○: One to five scratches were seen.

Δ: Six to 15 scratches were seen.

X: Sixteen or more scratches were seen.

A magnetic tape is produced as follows.

A hundred parts by weight (to be simply referred to as "parts" hereinafter) of γ-$Fe_2O_3$ and the following composition are kneaded and dispersed in a ball mill for 12 hours.

| | |
|---|---|
| polyester urethane | 12 parts |
| vinyl chloride-vinyl acetate-maleic anhydride copolymer | 10 parts |
| α-alumina | 5 parts |
| carbon black | 1 part |
| butyl acetate | 70 parts |
| methyl ethyl ketone | 35 parts |
| cyclohexanone | 100 parts |

After dispersion, one part of a fatty acid (oleic acid), one part of a fatty acid (palmitic acid) and one part of a fatty acid ester (amyl stearate) are added and kneaded for 10 to 30 minutes. Further, seven parts of an ethyl acetate solution containing 25% of a triisocyanate compound is further added and dispersed by shearing at a high speed for one hour to prepare a magnetic coating solution.

The obtained coating solution is applied to a polyester film to ensure that the thickness of a dry film becomes 3.5 μm.

Thereafter, the coated film is oriented in a DC magnetic field and dried at 100° C. After dried, the film is calendered and slit to a width of ½ inch to obtain a magnetic tape.

(11) Winding property index

A ½-inch-wide film is caused to pass through the apparatus shown in FIG. 1 without making contact with the fixed rod 7 and to travel 200 m at a rate of 200 m/min at a temperature of 20° C. and a humidity of 60%, and the edge position of the film is detected by a CCD camera at a location right before the film is taken up by the take-up reel 13.

Variation amount in the edge position of the film is expressed as a waveform with respect to the time axis and the winding property index is calculated from the waveform based on the following expression:

$$\text{winding property index} = \sqrt{\frac{1}{t}\int_0^1 f(x)^2 dx}$$

wherein t is a measurement time (sec) and x is a variation amount in the edge position (μm).

(12) Winding property

When the magnetic tape produced by the above method is caused to pass through the apparatus shown in FIG. 1 without making contact with the fixed rod 7 and to travel 500 m at a rate of 400 m/min, and the winding property of the tape is evaluated by whether the tape can be taken up by the take-up reel and the shape of the roll of the wound magnetic tape.

<criterion>

○: Non-uniformity in the edge of the wound roll is 1 mm or less.

Δ: Non-uniformity in the edge of the wound roll is more than 1 mm.

X: The tape cannot be wound.

(13) Number of protrusions with n or higher order interference fringes

Aluminum is deposited on the surface of the film and the number of protrusions with n or higher order interference fringes at a measurement wavelength of 0.54 μm is counted with a two-beam interference microscope and the number of protrusions with n or higher interference fringes per $cm^2$ is calculated from the number of protrusions in a measurement area of 5 $cm^2$. This measurement is carried out 5 times and the average of the measurement values is taken as the number of protrusions with n or higher order interference fringes.

(14) Drop out

The number of 5 μsec×10 dB drop outs of a magnetic tape (having a width of ½ inch and produced by the method described in (10)) is counted with a trade drop-out counter (for example, VH01BZ of Shibasoku Co., Ltd.) and a count value per minute is calculated.

(15) electromagnetic conversion characteristics

A VHS-system VTR (BR6400 of Victor Company of Japan, Ltd.) is remodeled and a 4-MHz sinusoidal wave is input into a read/write head through an amplifier, recorded on a magnetic tape and reproduced, and the reproduced signal is input into a spectrum analyzer. Noise generated at a location 0.1 MHz away from 4 MHz of the carrier signal is measured and the carrier/noise ratio (C/N) is expressed in the unit of dB. The C/N ratio of the above magnetic tape is measured using the above method, and the differences of C/N ratio between the magnetic tape and a magnetic tape obtained in Example 2 as a standard (±0 dB) for Examples 1 to 8 and Comparative Examples 1 to 6 and differences of C/N ratio between the magnetic tape and a magnetic tape obtained in Comparative Example 15 as a standard (±0 dB) for Examples 9 to 16 and Comparative Examples 7 to 18 are taken as electromagnetic conversion characteristics.

The following examples are given to further illustrate the present invention.

Examples 1 to 6 and Comparative Examples 1 to 6

(1) Production of silicone resin fine particles

Seven thousand grams of an aqueous solution containing 0.06 wt % of sodium hydroxide was charged into a 10-liter glass vessel equipped with stirring blades, and 1,000 g of methyl trimethoxysilane containing 0.01% of an adduct of nonylphenol with ethylene oxide was poured gently into a surface layer and reacted for 2 hours while the vessel was slightly rotated at 10 to 15° C. to generate spherical particles. Thereafter, the spherical particles were aged for about 1 hour at the system temperature of 70° C. and cooled, and a caked product of silicone resin fine particles having a moisture content of about 40% was obtained by a vacuum filter.

Four thousand grams of an aqueous solution containing 2 wt % of γ-glycidoxypropyl trimethoxysilane as a silane coupling agent was charged into another glass vessel, the whole amount of the caked product obtained in the above reaction was added to the vessel to make into a slurry, and the slurry was surface-treated under agitation over 3 hours at an inside temperature of 70° C., cooled and filtered with a vacuum filter to obtain a caked product.

The whole amount of this caked product was added to 6,000 g of purified water to make into a slurry again, which was then stirred at normal temperature at 60 rpm for 1 hour, stirred again under reduced pressure for 1 hour and filtered again with a vacuum filter to obtain a caked product with a moisture content of 40% from which an excessive emulsifier and an excessive silane coupling agent had been removed. Finally, the caked product was treated at a reduced pressure of 15 Torr at 100° C. for 10 hours, and about 400 g of silicone resin fine particles having a small content of agglomerate particles was obtained.

When the obtained fine particles were observed through an electron microscope, the shape of each of the particles was spherical and a particle size distribution obtained by the aforementioned centrifugal sedimentation method was such that 90% by weight or more of the fine particles had uniform particle diameters ranging from 0.5 to 0.7 μm and an average particle diameter of the fine particles was 0.6 μm.

Fine particles having an average particle diameter of 0.5 μm, 0.6 μm, 0.7 μm, 1.2 μm, 1.5 μm and 2.0 μm were obtained by adjusting the amounts of a catalyst and a surfactant almost in the same manner as described above.

(2) Production of polyester containing silicone resin fine particles:

Dimethyl terephthalate and ethylene glycol were polymerized by adding manganese acetate as an ester interchange catalyst, antimony trioxide as a polymerization catalyst, phosphorous acid as a stabilizer, silicone resin particles and other inert fine particles shown in Table 1 as lubricant s in accordance with a commonly used method to give polyethylene terephthalate having an intrinsic viscosity (in orthochlorophenol, at 35° C.) of 0.56.

(3) Formation of polyester film

Pellets of this polyethylene terephthalate were dried at 170° C. for 3 hours, supplied to the hopper of an extruder and molten at a temperature of 280 to 300° C. The molten polymer was extruded onto a rotary cooling drum having a surface temperature of 20° C. through a 1-mm slit die at a surface finish of about 0.3 s to give a 200 -μm-thick unstretched film.

The thus obtained unstretched film was preheated at 75° C., stretched to 3.2 times between low-speed and high-speed rolls while heated with three IR heaters having a surface temperature of 800° C. from 15 mm above, quenched and supplied to a stenter to be stretched to 4.3 times in a transverse direction at 120° C. The obtained biaxially oriented film was heat-set at 205° C. for 5 sec to give a heat-set biaxially oriented polyester film having a thickness of 14 μm. The average particle diameter, volume shape coefficient and relative standard deviation of the silicone resin particles and the number of coarse particles contained in the obtained film are shown in Table 1. The average particle diameter was the same value as that obtained by the centrifugal sedimentation method. The characteristic properties of the obtained film are shown in Table 2.

Examples 7 and 8

Polyethylene terephthalate for a polyester film layer A was obtained in the same manner as in Example 1, using the same silicone resin particles and other inert fine particles as in Example 1.

Polyethylene terephthalate for a polyester film layer B was obtained in the same manner as in Example 1 without adding fine particles.

Pellets of these polyethylene terephthalates were respectively dried at 170° C. for 3 hours, supplied to the hoppers of two extruders, molten at 280 to 300° C., laminated together using a multi-manifold coextrusion die in such a manner that layer A was formed on both sides of layer B, and extruded onto a rotary cooling drum having a surface temperature of 20° C. at a surface finish of about 0.3 s to give a 20-μm-thick unstretched film.

The thus obtained unstretched laminate film was stretched and heat-set in the same manner as in Example 1 to give a 14-μm-thick heat-set biaxially oriented laminate polyester film. The thickness of each layer was controlled by changing the discharges of the two extruders. The thickness of each layer was obtained by a fluorescent X-ray method together with a method for searching for an interface in the sliced film with a transmission-type electron microscope.

The characteristic properties of the thus obtained film are shown in Table 2.

As is obvious from Table 2, the film of the present invention has an extremely small number of coarse protrusions, few drop outs and excellent electromagnetic conversion characteristics, abrasion resistance and scratch resistance.

Examples 9 to 14 and Comparative Examples 7 to 17

Dimethyl terephthalate and ethylene glycol were polymerized by adding manganese acetate as an ester interchange catalyst, antimony trioxide as a polymerization catalyst, phosphorous acid as a stabilizer, and silicone resin particles A, inert fine particles B and inert fine particles C each shown in Table 3 as lubricants in accordance with a commonly used method to give polyethylene terephthalate having an intrinsic viscosity (in orthochlorophenol, at 35° C.) of 0.56.

Pellets of this polyethylene terephthalate were dried at 170° C. for 3 hours, supplied to the hopper of an extruder and molten at a temperature of 280 to 300° C. The molten polymer was extruded onto a rotary cooling drum having a surface temperature of 20° C. through a 1-mm slit die at a surface finish of about 0.3 s to give a 200 -μm-thick unstretched film.

The thus obtained unstretched film was preheated at 75° C., stretched to 3.2 times between low-speed and high-speed rolls by three IR heaters having a surface temperature of 800° C. from 15 mm above, quenched, supplied to a stenter and stretched to 4.3 times in a transverse direction at 120° C. The obtained biaxially oriented film was heat-set at 205° C. for 5 sec to give a 14-μm-thick heat set biaxially oriented polyester film. The measurement results of average particle diameters, volume shape coefficients, relative standard deviations and the like of the silicone resin particles A, the inert fine particles B and the inert fine particles C contained in the film are shown in Table 3. The physical properties of the obtained heat-set biaxially oriented polyester films are shown in Table 4.

Examples 15 and 16 and Comparative Example 18

Polyethylene terephthalate for a polyester film layer A was obtained in the same manner as in Example 1, using the same inert fine particles as in Example 1.

Polyethylene terephthalate for a polyester film layer B was obtained in the same manner as in Example 1 without adding inert fine particles.

Pellets of these polyethylene terephthalates were dried at 170° C. for 3 hours, supplied to the hoppers of two extruders and molten at a temperature of 280 to 300° C. The molten polymers were laminated together using a multi-manifold coextrusion die in such a manner that layer A was formed on both sides of layer B, and the resulting laminate was extruded onto a rotary cooling drum having a surface temperature of 20° C. at a surface finish of about 0.3 s to give a 200-μm-thick unstretched film.

The thus obtained unstretched laminate film was stretched and heat-set in the same manner as in Example 1 to give a 14-μm-thick heat-set biaxially oriented laminate polyester film.

The thickness of each layer was controlled by changing the discharges of the two extruders. The thickness of each layer was obtained by a fluorescent X-ray method and a method for searching for an interface in the sliced film by a transmission-type electron microscope. The average particle diameters, volume shape coefficients and the like of the particles A, B and C contained in the film are shown in Table 3. The characteristic properties of the obtained films are shown in Table 4.

As is obvious from Table 4, the biaxially oriented polyester films of the present invention have an extremely small number of coarse protrusions, few drop outs and excellent electromagnetic conversion characteristics, winding property and abrasion resistance and show extremely excellent overall characteristic properties including scratch resistance, abrasion resistance and traveling durability against various types of tape guides.

TABLE 1 particles contained in layer A
silicone resin particles

| | average particle diameter (μm) | surfactant | silane coupling agent | volume shape coefficient | relative standard deviation |
|---|---|---|---|---|---|
| Ex. 1 | 0.6 | nonylphenol adduct with ethylene oxide | γ-glycidoxypropyl trimethoxysilane | 0.45 | 0.13 |
| Ex. 2 | 0.6 | nonylphenol adduct with ethylene oxide | γ-glycidoxypropyl trimethoxysilane | 0.46 | 0.13 |
| Ex. 3 | 0.5 | nonylphenol adduct with ethylene oxide | γ-glycidoxypropyl trimethoxysilane | 0.48 | 0.11 |
| Ex. 4 | 0.5 | nonylphenol adduct with ethylene oxide | γ-glycidoxypropyl trimethoxysilane | 0.47 | 0.10 |
| Ex. 5 | 0.5 | nonylphenol adduct with ethylene oxide | γ-glycidoxypropyl trimethoxysilane | 0.48 | 0.11 |
| Ex. 6 | 0.5 | sodium dodecylbenzene sulfonate | γ-glycidoxypropyl trimethoxysilane | 0.48 | 0.12 |
| Ex. 7 | 0.6 | nonylphenol adduct with ethylene oxide | γ-glycidoxypropyl trimethoxysilane | 0.46 | 0.14 |
| Ex. 8 | 0.6 | nonylphenol adduct with ethylene oxide | γ-glycidoxypropyl trimethoxysilane | 0.46 | 0.13 |
| C. Ex. 1 | 0.6 | none | trimethoxysilane trimethoxysilane | 0.45 | 0.42 |
| C. Ex. 2 | 0.6 | none | none | 0.47 | 0.45 |
| C. Ex. 3 | 0.6 | nonylphenol adduct with ethylene oxide | γ-glycidoxypropyl trimethoxysilane | 0.45 | 0.13 |
| C. Ex. 4 | 1.5 | nonylphenol adduct witn ethylene oxide | γ-glycidoxypropyl trimethoxysilane | 0.45 | 0.14 |
| C. Ex. 5 | 0.5 | nonylphenol adduct with ethylene oxide | γ-glycidoxypropyl trimethoxysilane | 0.48 | 0.11 |
| C. Ex. 6 | 0.6 | nonylphenol adduct with ethylene oxide | γ-glycidoxypropyl trimethoxysilane | 0.45 | 0.13 | particles contained in layer A

| | silicone resin particles | | | other inert fine particles | |
|---|---|---|---|---|---|
| | number of coarse particles (per million particles) | hydroxyl value at surface (KOH mg/g) | content (wt %) | type of particles | average particle diameter (μm) | content (wt %) |
| Ex. 1 | 7 | 6.3 | 0.03 | θ-aluminum oxide | 0.1 | 0.2 |
| Ex. 2 | 9 | 7.8 | 0.1 | θ-aluminum oxide | 0.1 | 0.2 |

TABLE 1-continued

| | | | | | | |
|---|---|---|---|---|---|---|
| Ex. 3 | 11 | 7.4 | 0.015 | θ-aluminum oxide | 0.1 | 0.4 |
| Ex. 4 | 15 | 8.1 | 0.015 | spherical silica | 0.1 | 0.15 |
| Ex. 5 | 16 | 6.9 | 0.015 | spinel type oxide ($MgAl_2O_4$) | 0.1 | 0.4 |
| Ex. 6 | 11 | 5.1 | 0.015 | θ-aluminum oxide | 0.1 | 0.4 |
| Ex. 7 | 8 | 7.2 | 0.03 | θ-aluminum oxide | 0.1 | 0.2 |
| Ex. 8 | 8 | 7.5 | 0.03 | θ-aluminum oxide | 0.1 | 0.2 |
| C. Ex. 1 | 118 | 0.9 | 0.03 | θ-aluminum oxide | 0.1 | 0.2 |
| C. Ex. 2 | 166 | 2.7 | 0.03 | θ-aluminum oxide | 0.1 | 0.2 |
| C. Ex. 3 | 9 | 7.9 | 0.4 | θ-aluminum oxide | 0.1 | 0.2 |
| C. Ex. 4 | 3 | 8.8 | 0.05 | θ-aluminum oxide | 0.1 | 0.2 |
| C. Ex. 5 | 14 | 7.1 | 0.03 | calcium carbonate | 0.6 | 0.2 |
| C. Ex. 6 | 8 | 7.3 | 0.03 | none | — | — |

Ex.: Example
C. Ex.: Comparative Example

TABLE 2

| | thickness of layer A (μm) | thickness of layer B (μm) | surface roughness Ra of layer A (nm) | calender abrasion resistance (grade) | blade abrasion resistance | width of abrasion dust adhered (mm) |
|---|---|---|---|---|---|---|
| Ex. 1 | 14.0 | — | 7 | 1 | ⊚ | 0.2 |
| Ex. 2 | 14.0 | — | 14 | 2 | ○ | 0.6 |
| Ex. 3 | 14.0 | — | 5 | 1 | ⊚ | 0.1 |
| Ex. 4 | 14.0 | — | 5 | 1 | ⊚ | 0.1 |
| Ex. 5 | 14.0 | — | 5 | 1 | ⊚ | 0.1 |
| Ex. 6 | 14.0 | — | 5 | 1 | ⊚ | 0.1 |
| Ex. 7 | 1.5 | 11.0 | 6 | 1 | ⊚ | 0.2 |
| Ex. 8 | 1.0 | 12.0 | 5 | 1 | ⊚ | 0.2 |
| C. Ex. 1 | 14.0 | — | 7 | 1 | ⊚ | 0.3 |
| C. Ex. 2 | 14.0 | — | 7 | 3 | Δ | 1.2 |
| C. Ex. 3 | 14.0 | — | 27 | 5 | × | 2.8 |
| C. Ex. 4 | 14.0 | — | 20 | 4 | × | 2.2 |
| C. Ex. 5 | 14.0 | — | 14 | 3 | Δ | 1.5 |
| C. Ex. 6 | 14.0 | — | 6 | 1 | ⊚ | 0.2 |

| | high-speed traveling | | number of protrusions with secondary or higher order interference fringes (per $cm^2$) | number of drop outs (per minute) | electromagnetic conversion characteristics C/N (dB) |
|---|---|---|---|---|---|
| | abrasion resistance method B | scratch resistance method B | | | |
| Ex. 1 | ⊚ | ⊚ | 0.6 | 20 | +2.1 |
| Ex. 2 | ○ | ○ | 1.0 | 29 | 0 |
| Ex. 3 | ⊚ | ⊚ | 0.3 | 10 | +2.8 |
| Ex. 4 | ⊚ | ⊚ | 0.4 | 12 | +2.7 |
| Ex. 5 | ⊚ | ⊚ | 0.3 | 11 | +2.7 |
| Ex. 6 | ⊚ | ⊚ | 0.5 | 15 | +2.6 |
| Ex. 7 | ⊚ | ⊚ | 0.6 | 18 | +2.4 |
| Ex. 8 | ⊚ | ⊚ | 0.5 | 17 | +2.9 |
| C. Ex. 1 | ⊚ | ⊚ | 3.3 | 83 | +1.9 |
| C. Ex. 2 | Δ | ○ | 3.5 | 90 | +2.0 |
| C. Ex. 3 | × | Δ | 1.8 | 63 | −3.5 |
| C. Ex. 4 | × | Δ | 2.7 | 75 | −3.2 |
| C. Ex. 5 | Δ | ○ | 0.9 | 28 | −0.6 |
| C. Ex. 6 | ⊚ | × | 0.5 | 18 | +2.2 |

Ex.: Example, C. Ex.: Comparative Example

TABLE 3-1

| | particles contained in layer A silicone resin fine particles A | | | | | | |
|---|---|---|---|---|---|---|---|
| | average particle diameter (μm) | surfactant | silane coupling agent | volume shape coefficient | relative standard deviation | number of coarse large particles (per million particles) | hydroxyl value at surface (KOH mg/g) | content (wt %) |
| Ex. 9 | 1.2 | nonylphenol adduct with ethylene oxide | γ-glycidoxypropyl trimethoxysilane | 0.46 | 0.16 | 5 | 9.1 | 0.01 |
| Ex. 10 | 1.2 | nonylphenol adduct with ethylene oxide | γ-glycidoxypropyl trimethoxysilane | 0.44 | 0.15 | 4 | 8.5 | 0.02 |
| Ex. 11 | 1.2 | nonylphenol adduct with ethylene oxide | γ-glycidoxypropyl trimethoxysilane | 0.46 | 0.16 | 4 | 9.3 | 0.005 |
| Ex. 12 | 1.5 | nonylphenol adduct with ethylene oxide | γ-glycidoxypropyl trimethoxysilane | 0.46 | 0.14 | 2 | 8.3 | 0.01 |
| Ex. 13 | 1.2 | nonylphenol adduct with ethylene oxide | γ-glycidoxypropyl trimethoxysilane | 0.45 | 0.16 | 5 | 7.1 | 0.01 |
| Ex. 14 | 1.2 | nonylphenol adduct with ethylene oxide | γ-glycidoxyproyl trimethoxysilane | 0.46 | 0.15 | 5 | 6.5 | 0.01 |
| Ex. 15 | 1.2 | nonylphenol adduct with ethylene oxide | γ-glycidoxypropyl trimethoxysilane | 0.46 | 0.16 | 7 | 8.9 | 0.01 |
| Ex. 16 | 1.2 | nonylphenol adduct with ethylene oxide | γ-glycidoxypropyl trimethoxysilane | 0.45 | 0.16 | 6 | 8.8 | 0.01 |

TABLE 3-2

| | particles contained in layer A | | | | | | |
|---|---|---|---|---|---|---|---|
| | inert fine particles B | | | inert fine particles C | | | |
| | type of particles | average particle diameter (μm) | content (wt %) | type of particles | average particle diameter (μm) | content (wt %) | thickness of layer A (μm) | thickness of layer B (μm) |
| Ex. 9 | calcium carbonate | 0.6 | 0.2 | θ-aluminum oxide | 0.1 | 0.2 | 14.0 | — |
| Ex. 10 | calcium carbonate | 0.6 | 0.2 | θ-aluminum oxide | 0.1 | 0.2 | 14.0 | — |
| Ex. 11 | calcium carbonate | 0.6 | 0.2 | θ-aluminum oxide | 0.1 | 0.2 | 14.0 | — |
| Ex. 12 | calcium carbonate | 0.6 | 0.2 | θ-aluminum oxide | 0.1 | 0.2 | 14.0 | — |
| Ex. 13 | calcium carbonate | 0.6 | 0.2 | spinel type oxide ($MgAl_2O_4$) | 0.1 | 0.2 | 14.0 | — |
| Ex. 14 | calcium carbonate | 0.6 | 0.2 | θ-aluminum oxide | 0.1 | 0.2 | 14.0 | — |
| Ex. 15 | calcium carbonate | 0.6 | 0.2 | θ-aluminum oxide | 0.1 | 0.2 | 1.5 | 11.0 |
| Ex. 16 | calcium carbonate | 0.6 | 0.2 | θ-aluminum oxide | 0.1 | 0.2 | 1.0 | 12.0 |

Ex.: Example

TABLE 3-3

| | average particle diameter (μm) | surfactant | silane coupling agent | volume shape coefficient | relative standard deviation | number of coarse particles (per million particles) | hydroxyl value at surface (KOH mg/g) | content (wt %) |
|---|---|---|---|---|---|---|---|---|
| C. Ex. 7 | 1.2 | none | γ-glycidoxypropyl trimethoxysilane | 0.46 | 0.47 | 93 | 1.3 | 0.01 |
| C. Ex. 8 | 1.2 | none | none | 0.47 | 0.49 | 108 | 2.1 | 0.01 |
| C. Ex. 9 | — | — | — | — | — | — | — | — |
| C. Ex. 10 | 1.2 | nonylphenol adduct with ethylene oxide | γ-glycidoxypropyl trimethoxysilane | 0.46 | 0.16 | 6 | 8.7 | 0.01 |
| C. Ex. 11 | 1.2 | nonylphenol adduct with ethylene oxide | γglycidoxypropyl trimethoxysilane | 0.46 | 0.16 | 5 | 9.9 | 0.01 |
| C. Ex. 12 | 0.7 | nonylphenol adduct with ethylene oxide | γ-glycidoxypropyl trimethoxysilane | 0.45 | 0.20 | 10 | 9.1 | 0.01 |
| C. Ex. 13 | 2.0 | nonylphenol adduct with ethylene oxide | γ-glycidoxypropyl trimethoxysilane | 0.48 | 0.14 | 3 | 9.4 | 0.03 |
| C. Ex. 14 | 1.2 | nonylphenol adduct with ethylene oxide | γ-glycidoxypropyl trimethoxysilane | 0.46 | 0.15 | 7 | 8.1 | 0.0005 |
| C. Ex. 15 | 1.2 | nonylphenol adduct with ethylene oxide | γ-glycidoxypropyl trimethoxysilane | 0.45 | 0.16 | 6 | 9.8 | 0.05 |
| C. Ex. 16 | 1.2 | nonylphenol adduct with ethylene oxide | γ-glycidoxypropyl trimethoxysilane | 0.46 | 0.16 | 5 | 7.9 | 0.01 |
| C. Ex. 17 | 1.2 | nonylphenol adduct with ethylene oxide | γ-glycidoxypropyl trimethoxysilane | 0.46 | 0.15 | 5 | 8.4 | 0.01 |
| C. Ex. 18 | 1.2 | nonylphenol adduct with ethylene oxide | γ-glycidoxypropyl trimethoxysilane | 0.47 | 0.16 | 6 | 9.5 | 0.01 |

C. Ex.: Comparative Example

TABLE 3-4

| | particles contained in layer A | | | | | | |
|---|---|---|---|---|---|---|---|
| | inert fine particles B | | | inert fine particles C | | | |
| | type of particles | average particle diameter (μm) | content (wt %) | type of particles | average particle diameter (μm) | content (wt %) | thickness of layer A (μm) | thickness of layer B (μm) |
| C. Ex. 7 | calcium carbonate | 0.6 | 0.2 | θ-aluminum oxide | 0.1 | 0.2 | 14.0 | — |
| C. Ex. 8 | calcium carbonate | 0.6 | 0.2 | θ-aluminum oxide | 0.1 | 0.2 | 14.0 | — |
| C. Ex. 9 | calcium carbonate | 0.6 | 0.2 | θ-aluminum oxide | 0.1 | 0.2 | 14.0 | — |
| C. Ex. 10 | — | — | — | θ-aluminum oxide | 0.1 | 0.2 | 14.0 | — |
| C. Ex. 11 | calcium carbonate | 0.6 | 0.2 | — | — | — | 14.0 | — |
| C. Ex. 12 | calcium carbonate | 0.6 | 0.2 | θ-aluminum oxide | 0.1 | 0.2 | 14.0 | — |
| C. Ex. 13 | calcium carbonate | 0.6 | 0.2 | θ-aluminum oxide | 0.1 | 0.2 | 14.0 | — |
| C. Ex. 14 | calcium carbonate | 0.6 | 0.2 | θ-aluminum oxide | 0.1 | 0.2 | 14.0 | — |
| C. Ex. 15 | calcium carbonate | 0.6 | 0.2 | θ-aluminum oxide | 0.1 | 0.2 | 14.0 | — |
| C. Ex. 16 | calcium carbonate | 0.6 | 0.2 | spherical silica | 0.1 | 0.2 | 14.0 | — |
| C. Ex. 17 | calcium carbonate | 0.6 | 1.2 | θ-aluminum oxide | 0.1 | 0.2 | 14.0 | — |

TABLE 3-4-continued

| | particles contained in layer A | | | | | | |
|---|---|---|---|---|---|---|---|
| | inert fine particles B | | | inert fine particles C | | | |
| | type of particles | average particle diameter (μm) | content (wt %) | type of particles | average particle diameter (μm) | content (wt %) | thickness of layer A (μm) | thickness of layer B (μm) |
| C. Ex. 18 | calcium carbonate | 0.6 | 0.2 | θ-aluminum oxide | 0.1 | 0.2 | 0.3 | 13.4 |

C. Ex.: Comparative Example

TABLE 4-1

| | surface roughness Ra of layer A (nm) | calender abrasion resistance (grade) | blade abrasion resistance width of abrasion dust adhered (mm) | high-speed traveling | | | | | |
|---|---|---|---|---|---|---|---|---|---|
| | | | | scratch resistance | | | abrasion resistance | | |
| | | | | method A | method B | method C | method A | method B | method C |
| Ex. 9 | 15 | 1 | ⊚ 0.3 | ⊚ | ⊚ | ⊚ | ⊚ | ⊚ | ⊚ |
| Ex. 10 | 16 | 2 | ○ 0.8 | ⊚ | ⊚ | ⊚ | ⊚ | ⊚ | ⊚ |
| Ex. 11 | 15 | 1 | ⊚ 0.1 | ⊚ | ⊚ | ⊚ | ⊚ | ⊚ | ⊚ |
| Ex. 12 | 16 | 2 | ⊚ 0.4 | ⊚ | ⊚ | ⊚ | ⊚ | ⊚ | ⊚ |
| Ex. 13 | 15 | 1 | ⊚ 0.3 | ⊚ | ⊚ | ⊚ | ⊚ | ⊚ | ⊚ |
| Ex. 14 | 15 | 1 | ⊚ 0.3 | ⊚ | ⊚ | ⊚ | ⊚ | ⊚ | ⊚ |
| Ex. 15 | 13 | 1 | ⊚ 0.3 | ⊚ | ⊚ | ⊚ | ⊚ | ⊚ | ⊚ |
| Ex. 16 | 11 | 1 | ⊚ 0.3 | ⊚ | ⊚ | ⊚ | ⊚ | ⊚ | ⊚ |

Ex.: Example

TABLE 4-2

| | low-speed repeated traveling | | | | | | | | number of protrusions with tertiary of higher-order interference fringes (per cm$^2$) | number of drop outs (per minute) | electromagnetic conversion characteristics C/N (dB) |
|---|---|---|---|---|---|---|---|---|---|---|---|
| | scratch resistance | | | traveling friction coefficient μk | | | winding property index | winding property | | | |
| | method A | method B | method C | method A | method B | method C | | | | | |
| Ex. 9 | ⊚ | ⊚ | ⊚ | 0.21 | 0.21 | 0.20 | 60 | ○ | 0.5 | 21 | +1.8 |
| Ex. 10 | ⊚ | ⊚ | ⊚ | 0.20 | 0.20 | 0.19 | 50 | ○ | 0.8 | 31 | +1.5 |
| Ex. 11 | ⊚ | ⊚ | ⊚ | 0.22 | 0.22 | 0.22 | 70 | ○ | 0.3 | 15 | +1.9 |
| Ex. 12 | ⊚ | ⊚ | ⊚ | 0.21 | 0.21 | 0.19 | 50 | ○ | 0.6 | 23 | +1.6 |
| Ex. 13 | ⊚ | ⊚ | ⊚ | 0.21 | 0.21 | 0.20 | 60 | ○ | 0.5 | 20 | +1.8 |
| Ex. 14 | ⊚ | ⊚ | ⊚ | 0.21 | 0.21 | 0.20 | 60 | ○ | 0.6 | 22 | +1.8 |
| Ex. 15 | ⊚ | ⊚ | ⊚ | 0.21 | 0.21 | 0.20 | 60 | ○ | 0.5 | 19 | +2.5 |
| Ex. 16 | ⊚ | ⊚ | ⊚ | 0.22 | 0.22 | 0.21 | 70 | ○ | 0.4 | 17 | +3.1 |

Ex.: Example

TABLE 4-3

| | surface roughness Ra of layer A (nm) | calender abrasion resistance (grade) | blade abrasion resistance width of abrasion dust adhered (mm) | high-speed traveling scratch resistance method A | method B | method C | abrasion resistance method A | method B | method C |
|---|---|---|---|---|---|---|---|---|---|
| C. Ex. 7 | 15 | 1 | ⊚ 0.3 | ⊚ | ⊚ | ⊚ | ⊚ | ⊚ | ⊚ |
| C. Ex. 8 | 15 | 4 | △ 1.7 | ○ | ○ | ○ | △ | △ | △ |
| C. Ex. 9 | 12 | 1 | ⊚ 0.2 | ⊚ | ⊚ | ⊚ | ⊚ | ⊚ | ⊚ |
| C. Ex. 10 | 7 | 1 | ⊚ 0.3 | ○ | ⊚ | △ | ○ | ⊚ | △ |
| C. Ex. 11 | 15 | 1 | ⊚ 0.3 | × | × | △ | ○ | ○ | ○ |
| C. Ex. 12 | 15 | 1 | ⊚ 0.2 | ⊚ | ⊚ | ⊚ | ⊚ | ⊚ | ⊚ |
| C. Ex. 13 | 19 | 4 | △ 1.3 | ⊚ | ⊚ | ⊚ | △ | △ | △ |
| C. Ex. 14 | 15 | 1 | ⊚ 0.1 | ⊚ | ⊚ | ⊚ | ⊚ | ⊚ | ⊚ |
| C. Ex. 15 | 18 | 4 | × 2.5 | ⊚ | ⊚ | ⊚ | ○ | ○ | ⊚ |
| C. Ex. 16 | 15 | 1 | ⊚ 0.3 | △ | △ | △ | △ | △ | △ |
| C. Ex. 17 | 27 | 5 | × 2.6 | ○ | ○ | ○ | ○ | △○ | |
| C. Ex. 18 | 7 | 1 | ○ 0.7 | △ | △ | △ | △ | △ | △ |

C. Ex.: Comparative Example

TABLE 4-4

| | low-speed repeated traveling scratch resistance method A | method B | method C | traveling friction coefficient μk method A | method B | method C | winding property index | winding property | number of protrusions with tertiary or higher-order interference fringes (per cm²) | number of drop outs (per minute) | electromagnetic conversion characteristics C/N (dB) |
|---|---|---|---|---|---|---|---|---|---|---|---|
| C. Ex. 7 | ⊚ | ⊚ | ⊚ | 0.21 | 0.21 | 0.20 | 50 | ○ | 2.3 | 89 | +1.6 |
| C. Ex. 8 | ○ | ○ | ○ | 0.24 | 0.25 | 0.25 | 50 | ○ | 2.5 | 92 | +1.5 |
| C. Ex. 9 | ⊚ | ⊚ | ⊚ | 0.23 | 0.23 | 0.24 | 200 | × | 0.3 | 15 | +2.5 |
| C. Ex. 10 | ○ | ⊚ | △ | 0.32 | 0.31 | 0.31 | 140 | △ | 0.5 | 20 | +3.6 |
| C. Ex. 11 | × | × | △ | 0.23 | 0.23 | 0.22 | 60 | ○ | 0.5 | 22 | +1.8 |
| C. Ex. 12 | ⊚ | ⊚ | ⊚ | 0.21 | 0.21 | 0.20 | 120 | △ | 0.4 | 19 | +1.8 |
| C. Ex. 13 | ⊚ | ⊚ | ⊚ | 0.23 | 0.23 | 0.22 | 50 | ○ | 1.8 | 73 | −0.7 |
| C. Ex. 14 | ⊚ | ⊚ | ⊚ | 0.21 | 0.21 | 0.20 | 110 | △ | 0.4 | 17 | +1.8 |
| C. Ex. 15 | ⊚ | ⊚ | ⊚ | 0.19 | 0.19 | 0.18 | 40 | ○ | 1.3 | 55 | 0 |
| C. Ex. 16 | △ | △ | △ | 0.22 | 0.22 | 0.24 | 60 | ○ | 0.6 | 17 | +1.8 |
| C. Ex. 17 | ○ | ○ | ○ | 0.20 | 0.20 | 0.21 | 80 | ○ | 0.8 | 30 | −2.0 |
| C. Ex. 18 | △ | △ | △ | 0.30 | 0.30 | 0.32 | 190 | × | 0.2 | 11 | +3.7 |

C. Ex.: Comparative Example

What is claimed is:

1. A biaxially oriented polyester film for a magnetic recording medium, which comprises an aromatic polyester resin composition comprising:

(A) an aromatic polyester;

(B) 0.01 to 0.3 wt % of silicone resin particles (a) which can be obtained by polymerizing a silane compound containing trialkoxysilane represented by the following formula (1):

$$R^1Si(OR^2)_3 \quad (1)$$

wherein $R^1$ is an alkyl group having 1 to 6 carbon atoms or a phenyl group and $R^2$ is an alkyl group having 1 to 4 carbon atoms, in the presence of a surfactant and water and contain at least 80 wt % of recurring units represented by the following formula (2):

$$R^1SiO_{3/2} \quad (2)$$

wherein $R^1$ is the same as defined above, (b) which are substantially spherical, and (c) which have an average particle diameter of 0.1 to 1.0 μm; and (C) 0.05 to 1.0 wt % of other inert fine particles having an average particle diameter, smaller than that of the above silicone resin particles, of 0.01 to 0.5 μm, wherein said silicone resin particles are substantially spherical with a volume shape coefficient of 0.4 to 0.52, and have particle diameter 3 times or more the average particle diameter at a density of 30 or less per million particles.

2. The film of claim 1, wherein the silicone resin particles have a particle size distribution with a relative standard deviation of 0.3 or less.

3. The film of claim 1, wherein the silicone resin particles have a hydroxyl value at the surface of 3 to 40 KOHmg/g.

4. The film of claim 1, wherein the silicone resin particles have been surface-treated with a silane coupling agent.

5. The film of claim 4, wherein the silicone resin particles have a hydroxyl value at the surface of 3 to 10 KOHmg/g.

6. The film of claim 1, wherein the surfactant is at least one member selected from the group consisting of polyoxyethylene alkylphenyl ethers and sodium alkylbenzene sulfonates.

7. The film of claim 1, wherein the other inert fine particles (C) are at least one member selected from the group consisting of aluminum oxide particles, silica particles and spinel oxide particles.

8. The film of claim 1, which shows such blade abrasion resistance that the width of abrasion dust adhered to the edge of a blade is smaller than 0.5 mm.

9. The film of claim 1, which has a center line average surface roughness Ra of 3 to 10 nm.

10. A biaxially oriented polyester film for a magnetic recording medium, which comprises the film of claim 1 and another aromatic polyester film formed on at least one side of the film, the film of claim 1 having a thickness of 0.1 to 1.0 μm.

11. The film of claim 1 or 10, which has protrusions with secondary or higher order interference fringes on the surface at a density of 1.5 or less per cm$^2$.

12. A biaxially oriented polyester film for a magnetic recording medium, which comprises an aromatic polyester resin composition comprising:

(A) an aromatic polyester;

(B) 0.001 to 0.03 wt % of silicone resin particles
  (a) which can be obtained by polymerizing a silane compound containing trialkoxysilane represented by the following formula (1):

$$R^1Si(OR^2)_3 \quad (1)$$

wherein $R^1$ is an alkyl group having 1 to 6 carbon atoms or a phenyl group and $R^2$ is an alkyl group having 1 to 4 carbon atoms, in the presence of a surfactant and water and contain at least 80 wt % of recurring units represented by the following formula (2):

$$R^1SiO_{3/2} \quad (2)$$

wherein $R^1$ is the same as defined above,
  (b) which are substantially spherical, and;
  (c) which have an average particle diameter of 0.8 to 1.6 μm;

(C) 0.1 to 0.6 wt % of inert fine particles B having an average particle diameter of 0.4 to 0.7 μm; and;

(D) 0.05 to 1.0 wt % of inert fine particles C having an average particle diameter of 0.01 to 0.3 μm and a Mohs hardness of 7 or more, wherein said silicone resin particles are substantially spherical with a volume shape coefficient of 0.4 to 0.52, and have particle diameter 3 times or more the average particle diameter at a density of 30 or less per million particles.

13. The film of claim 12, wherein the silicone resin particles have a particle size distribution with a relative standard deviation of 0.3 or less.

14. The film of claim 12, wherein the silicone resin particles have a hydroxyl value at the surface of 3 to 40 KOHmg/g.

15. The film of claim 12, wherein the silicone resin particles have been surface-treated with a silane coupling agent.

16. The film of claim 15, wherein the silicone resin particles have a hydroxyl value at the surface of 3 to 10 KOHmg/g.

17. The film of claim 12, wherein the surfactant is at least one member selected from the group consisting of polyoxyethylene alkylphenyl ethers and sodium alkylbenzene sulfonates.

18. The film of claim 12, wherein the inert fine particles B are calcium carbonate.

19. The film of claim 12, wherein the inert fine particles C are at least one member selected from the group consisting of aluminum oxide particles and spinel oxide particles.

20. The film of claim 12, which shows such blade abrasion resistance that the width of abrasion dust adhered to the edge of a blade is smaller than 0.5 mm.

21. The film of claim 12, which has a center line average surface roughness Ra of 10 to 25 nm.

22. A biaxially oriented polyester film for a magnetic recording medium, which comprises the film of claim 12 and another aromatic polyester film formed on at least one side of the film, the film of claim 14 having a thickness of 0.5 to 2.0 μm.

23. The film of claim 12 or 22, which has protrusions with tertiary or higher order interference fringes at a density of 1.0 or less per cm$^2$.

24. The film of claim 12 or 22, which has a winding property index of 100 or less at a winding rate of 200 m/min.

25. The film of claim 1, 10, 12 or 22, which has a thickness of 3 to 20 μm.

26. The film of claim 1 or 12, wherein the aromatic polyester is polyalkylene terephthalate or polyalkylene naphthalene dicarboxylate.

* * * * *